United States Patent
Musa et al.

(10) Patent No.: US 9,493,598 B2
(45) Date of Patent: Nov. 15, 2016

(54) POLYMERS HAVING ACID AND AMIDE MOIETIES, AND USES THEREOF

(75) Inventors: Osama M. Musa, Kinnelon, NJ (US); Cuiyue C. Lei, Wayne, NJ (US)

(73) Assignee: ISP INVESTMENTS LLC, Wilmington, DE (US)

( * ) Notice: Subject to any disclaimer, the term of this patent is extended or adjusted under 35 U.S.C. 154(b) by 297 days.

(21) Appl. No.: 13/640,915

(22) PCT Filed: Apr. 13, 2011

(86) PCT No.: PCT/US2011/032255
§ 371 (c)(1),
(2), (4) Date: Dec. 4, 2012

(87) PCT Pub. No.: WO2011/130370
PCT Pub. Date: Oct. 20, 2011

(65) Prior Publication Data
US 2013/0123147 A1    May 16, 2013

Related U.S. Application Data

(60) Provisional application No. 61/323,934, filed on Apr. 14, 2010.

(51) Int. Cl.
| | | |
|---|---|---|
| *C08F 226/06* | (2006.01) | |
| *C08F 230/02* | (2006.01) | |
| *C09K 8/52* | (2006.01) | |
| *C09K 15/30* | (2006.01) | |

(52) U.S. Cl.
CPC ........... *C08F 226/06* (2013.01); *C08F 230/02* (2013.01); *C09K 8/52* (2013.01); *C09K 15/30* (2013.01)

(58) Field of Classification Search
CPC .... C08F 226/06; C08F 230/02; C09K 15/30; C09K 8/52
USPC ........... 507/90, 123; 252/390; 525/263, 264
See application file for complete search history.

(56) References Cited

U.S. PATENT DOCUMENTS

| | | |
|---|---|---|
| 5,723,524 A | 3/1998 | Cohen et al. |
| 6,194,622 B1 | 2/2001 | Peiffer et al. |
| 6,319,971 B1 | 11/2001 | Kelland et al. |

OTHER PUBLICATIONS

International Search Report, PCT/US2011/030642, published on Oct. 20, 2011.

*Primary Examiner* — Frances Tischler
(74) *Attorney, Agent, or Firm* — William J. Davis

(57) ABSTRACT

Polymers are described that are polymerized from at least one reactive vinyl monomer having acid functionality or a salt thereof, and at least one reactive vinyl monomer having amide functionality. These polymers have a molecular weight from about 500 Da to about 15,000 Da; and may additionally comprise one or more solvent adducts. These polymers may be included in compositions that find use in oilfield applications, such as for inhibition and/or prevention of gas hydrates and/or corrosion.

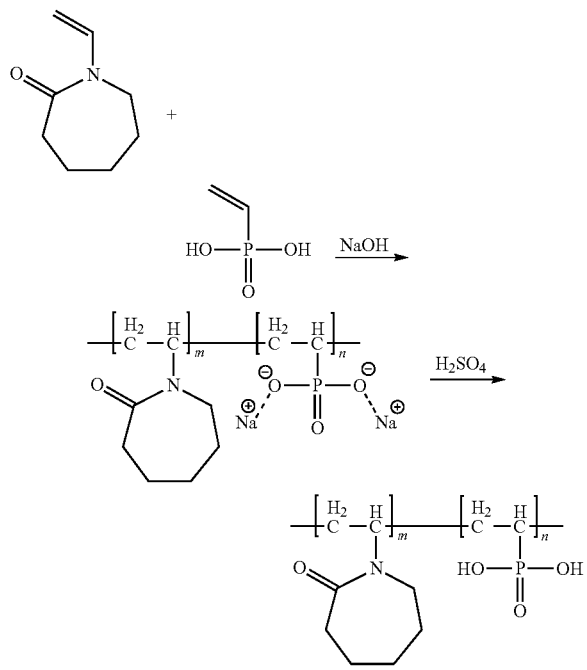

17 Claims, No Drawings ions comprising such polymers may be used for gas hydrate
POLYMERS HAVING ACID AND AMIDE MOIETIES, AND USES THEREOF The present application claims priority under 35 U.S.C. 365(c) of international application number PCT/US2011/032255 filed on Apr. 13, 2011 which claims priority of U.S. Provisional application No. 61/323,934 filed on Apr. 14, 2010, the entire content which is hereby expressly incorporated herein by reference.

BACKGROUND

Field of the Invention

The present application relates to various related polymers polymerized from at least one reactive vinyl monomer containing an acid functionality and at least one reactive vinyl monomer containing amide functionality. Compositions comprising such polymers may be used for gas hydrate inhibition and corrosion resistance.

Description of Related Art

It is known in oilfield operations that gas hydrates, also known as clathrate hydrates form under certain conditions in fluids having water and hydrate-forming molecules. The gas hydrate formation may lead to blockade of a wide variety of fluid transportation means such as pipelines, valves and production systems. In order to prevent this, gas hydrate inhibitors are added to the fluids.

Two types of inhibitors have been identified that inhibit gas hydrate formation, thermodynamic inhibitors and kinetic inhibitors. Both types are distinguished from hydrate anti-agglomerants, which prevent the hydrate crystals from agglomerating and accumulating into large masses.

Thermodynamic inhibitors shift the equilibrium hydrate dissociation/stability curve, i.e., the hydrate-aqueous liquid-vapor equilibrium (HLVE) curve, to a lower temperature and thus avoid the hydrate formation. Methanol is such an inhibitor that is quite effective and widely used. However, as exploration and production moves to deeper seas, temperature and pressure conditions in the field become in favor of hydrate formation, i.e., the temperature is colder and the pressure is higher, and the addition of this type of inhibitor can be expensive and environmentally prohibitive; the inhibitor concentration required to prevent hydrate formation is very high, often in excess of 60% (w/w). Sodium chloride is another example that has been used as a thermodynamic inhibitor. However, adding inorganic salts alone may lead to corrosion problems.

Kinetic inhibitors, on the other hand, do not prevent the hydrate formation at a certain condition, but retard the hydrate formation rate by slowing down the hydrate nucleation and growth rates. In deep sea gas exploration, an effective gas hydrate inhibitor delays the hydrate formation to a longer time than the residence time of the fluids in the hydrate-prone section of pipeline. Poly(N-vinyl-2-pyrrolidone) (PYP) is an example of a kinetic inhibitor.

A number of these gas hydrate inhibitors are described U.S. Pat. Nos. 3,629,101; 5,639,925; 6,177,497; and 6,194,622; and U.S. Patent Application Publication Nos. 2006/0058449 and 2007/0100102.

In addition to the problems posed by gas hydrates, corrosion can affect the extraction of hydrocarbons. Corrosion also impacts a multitude of other industries, such as electrical power generation, marine, chemical, and transportation. It is important for organizations to protect the essential structures from corrosion.

The existing gas hydrate inhibitors and corrosion inhibitors lack in their performance, especially for products having both gas hydrate inhibition and corrosion properties. Therefore, there is a need for better gas hydrate inhibitors and corrosion inhibitors.

SUMMARY

Described herein are polymers polymerized from at least one reactive vinyl monomer containing an acid functionality or a salt thereof, and at least one reactive vinyl monomer containing an amide functionality, and also having: (i) a molecular weight from about 500 Da to about 15,000 Da, or (ii) at least one solvent adduct, or (iii) both (i) and (ii).

Also described herein are compositions comprising polymers according to the invention and uses thereof. Examples of specific uses include gas hydrate inhibition, anti-agglomeration, and/or corrosion inhibition of materials comprising iron, such as grades of cast iron, wrought iron, and steel (i.e., alloys comprising iron and carbon).

DETAILED DESCRIPTION

As used in the specification and claims of this application, the following definitions shall be applied:

The term gas hydrate inhibitor refers to polymers and compositions thereof that prevent or retard the formation of gas hydrates, or reduce the tendency for said hydrates to agglomerate during storage and/or hydraulic transport of fluids comprising water and hydrate forming guest molecules.

The term monomer refers to the repeat units that form a polymer. A monomer is a molecule that chemically bonds to other molecules, including other monomers, to form a polymer.

The term polymer refers to both linear and branched polymers polymerized from one or more monomer units, which may or may not be crosslinked, or grafted. Nonlimiting examples of polymers include copolymers, terpolymers, tetramers, and the like, wherein the polymer is random, block, or alternating polymer.

The term non-homopolymer refers to a polymer that comprises more than one type of monomer, and includes such polymers wherein a small amount of polymerization solvent may be covalently bonded into the polymer.

The term copolymer refers to a polymer that comprises two different monomer units.

The term terpolymer refers to a polymer that comprises three different monomer units.

The term branched refers to any non-linear molecular structure. To avoid any arbitrary delineation, the term branched describes both branched and hyperbranched structures.

The term free radical addition polymerization initiator refers to a compound used in a catalytic amount to initiate a free radical addition polymerization. The choice of initiator depends mainly upon its solubility and its decomposition temperature.

The term solvent adduct refers to a solvent molecule that is bonded to a molecule such as a polymer by one or more covalent bonds, ionic bonds, hydrogen bonds, co-ordinate covalent bonds, or Van der Waals forces of attraction.

The term hydrocarbyl refers to a substituted or unsubstituted alkyl, alkenyl, cycloalkyl, cycloalkenyl or aralkyl, mono-, di- or poly-functional radical that may further contain one or more hetero atoms.

The term hetero atom refers to an atom other than carbon, such as oxygen, nitrogen, sulfur, or phosphorus.

The term personal care composition refers to compositions intended for use on or in the human body, such as skin, sun, oil, hair, cosmetic, and preservative compositions, including those to alter the color and appearance of the skin and hair. Potential personal care compositions include, but are not limited to, compositions for increased flexibility in hair styling, durable hair styling, increased humidity resistance for hair, skin and color cosmetics, sun-care, waterproof/resistance, wear-resistance, and thermal protecting/enhancing compositions.

The term performance chemicals composition refers to non-personal care compositions that serve a broad variety of applications, and include nonlimiting compositions such as: adhesives, agricultural, biocides, coatings, electronics, household-industrial-institutional (HI&I), inks, membranes, metal fluids, oilfield, paper, paints, plastics, printing, plasters, and wood-care compositions.

The subscripts "m" and "n" as used herein with regard to chemical structures refer to integers commonly used in polymers to denote the number of repeating units of each monomer. In general, m and n in the present invention may be independently selected such that the polymer molecular weight typically is from about 500 Da to about 15,000 Da.

All percentages, ratio, and proportions used herein are based on a weight basis unless otherwise specified. Molecular weights are weight average molecular weight ($M_w$) unless indicated otherwise.

It has been discovered that polymers polymerized from at least one reactive vinyl monomer containing acid functionality or a salt thereof, and at least one reactive vinyl monomer containing an amide functionality perform effectively in applications involving oilfield operations, particularly gas hydrate inhibition. In addition, these polymers typically exhibit corrosion inhibition, and find utility in operations wherein corrosion is problematic, e.g., petrochemicals, electrical power generation, marine, and chemicals.

More specifically and in accordance with one embodiment, the polymers: (A) are polymerized from at least one reactive vinyl monomer containing an acid functionality or a salt thereof and at least one reactive vinyl monomer containing an amide functionality, and (B) have a molecular weight particularly from about 500 Da to about 15,000 Da, more particularly from about 800 Da to about 12,500 Da, and yet more particularly from about 1,000 Da to about 10,000 Da. The reactive vinyl monomer containing an acid functionality or a salt thereof may be present from about 0.1% to about 99.9% by weight of the polymer, more particularly from 1% to about 50%, and yet more particularly from about 5% to 30%. The reactive vinyl monomer containing an amide functionality may be present from about 0.1% to about 99.9% by weight of the polymer, more particularly from 50% to 99%, and yet more particularly from 70% to 95%. The polymers may further comprise one or more solvent adducts.

The reactive vinyl monomer containing an acid functionality according to one aspect may be selected from vinyl sulfonic acids, vinyl phosphonic acids, acrylamido hydrocarbyl sulfonic acids, acrylamido hydrocarbyl phosphonic acid, salts thereof, derivatives thereof, and blends thereof.

A representative list of vinyl sulfonic acids includes: ethenesulfonic acid, 1-propene-1-sulfonic acid, 2-propene-1-sulfonic acid, 2-butene-1-sulfonic acid, 1-butene-1-sulfonic acid, 3-butene-1-sulfonic acid, 3-allyloxy-2-hydroxy-1-propane-sulfonic acid, 3-sulfopropyl acrylate, 2-sulfoethyl acrylate, salts thereof, derivatives thereof, and blends thereof. In one embodiment the salts of vinyl sulfonic acid include salts of the acid with alkali metal elements, alkaline earth metal elements, or elements of the Lanthanide or Actinide series, and blends thereof. In another embodiment the salts may be ammonium, sodium, potassium, calcium, barium, and/or magnesium salts of vinyl sulfonic acids.

A representative list of vinyl phosphonic acids includes: ethenephosphonic acid, 1-propene-1-phosphonic acid, 2-propene-1-phosphonic acid, 2-butene-1-phosphonic acid, 1-butene-1-phosphonic acid, 3-butene-1-phosphonic acid, salts thereof, derivatives thereof, and blends thereof. The vinyl phosphonic acid may be ethenephosphonic acid. The salts of vinyl phosphonic acid include salts of the acid with alkali metal elements, alkaline earth metal elements, or elements of the Lanthanide or Actinide series, and blends thereof. For example, the salts may be ammonium, sodium, potassium, calcium, barium, and/or magnesium salts of vinyl phosphonic acids.

A representative list of acrylamido hydrocarbyl sulfonic acids includes: 2-acrylamido-2-methyl propane sulfonic acid (AMPS), 2-acrylamido-2-ethyl propane sulfonic acid, 2-acrylamido-2-propyl propane sulfonic acid, 2-methacrylamido-2-methyl propane sulfonic acid, 2-methacrylamido-2-ethyl propane sulfonic acid, 2-methacrylamido-2-propyl propane sulfonic acid, N-methyl-2-acrylamido-2-methyl propane sulfonic acid, N-methyl-2-acrylamido-2-ethyl propane sulfonic acid, N-methyl-2-acrylamido-2-propyl propane sulfonic acid, N-methyl-2-methacrylamido-2-methyl propane sulfonic acid, N-methyl-2-methacrylamido-2-ethyl propane sulfonic acid, N-methyl-2-methacrylamido-2-propyl propane sulfonic acid, 2-acrylamido-1-butane sulfonic acid, 2-acrylamido-1-pentane sulfonic acid, 2-acrylamido-1-hexane sulfonic acid, 2-methacrylamido-1-butane sulfonic acid, 2-methacrylamido-1-pentane sulfonic acid, 2-methacrylamido-1-hexane sulfonic acid, 2-acrylamido-1-heptane sulfonic acid, 2-methacrylamido-1-heptane sulfonic acid, N-methyl-2-acrylamido-1-butane sulfonic acid, N-methyl-2-methacrylamido-1-butane sulfonic acid, N-methyl-2-acrylamido-1-pentane sulfonic acid, N-methyl-2-methacrylamido-1-pentane sulfonic acid, N-methyl-2-acrylamido-1-hexane sulfonic acid, N-methyl-2-methacrylamido-1-hexane sulfonic acid, N-methyl-2-acrylamido-1-heptane sulfonic acid, N-methyl-2-methacrylamido-1-heptane sulfonic acid, salts thereof, derivatives thereof, and blends thereof. References disclosing acrylamido hydrocarbyl sulfonic acids include U.S. Pat. No. 3,506,707, the contents of which are incorporated herein their entirety by reference. 2-acrylamido-2-methyl propane sulfonic acid (AMPS) is a particularly useful acrylamido hydrocarbyl sulfonic acid.

The salts of acrylamido hydrocarbyl sulfonic acid include salts of the acid with alkali metal elements, alkaline earth metal elements, or elements of the Lanthanide or Actinide series, and blends thereof. For example, the salts can be ammonium, sodium, potassium, calcium, barium, and/or magnesium salts of the acrylamido hydrocarbyl sulfonic acid.

A representative list of acrylamido hydrocarbyl phosphoric acids includes: 2-acrylamido-2-methyl propane phosphonic acid, 2-acrylamido-2-ethyl propane phosphonic acid, 2-acrylamido-2-propyl propane phosphonic acid, 2-methacrylamido-2-methyl propane phosphonic acid, 2-methacrylamido-2-ethyl propane phosphonic acid, 2-methacrylamido-2-propyl propane phosphonic acid, N-methyl-2-acrylamido-2-methyl propane phosphonic acid, N-methyl-2-acrylamido-2-ethyl propane phosphonic acid, N-methyl-2-acrylamido-2-propyl propane phosphonic acid, N-methyl-2-methacrylamido-2-methyl propane phosphonic acid, N-methyl-2-methacrylamido-2-ethyl propane phosphonic acid, N-methyl-2-methacrylamido-2-propyl propane phosphonic acid, 2-acrylamido-1-butane phosphonic acid, 2-acrylamido-1-pentane phosphonic acid, 2-acrylamido-1-hexane phosphonic acid, 2-methacrylamido-1-butane phosphonic acid, 2-methacrylamido-1-pentane phosphonic acid, 2-methacrylamido-1-hexane phosphonic acid, 2-acrylamido-1-heptane phosphonic acid, 2-methacrylamido-1-heptane phosphonic acid, N-methyl-2-acrylamido-1-butane phosphonic acid, N-methyl-2-methacrylamido-1-butane phosphonic acid, N-methyl-2-acrylamido-1-pentane phosphonic acid, N-methyl-2-methacrylamido-1-pentane phosphonic acid, N-methyl-2-acrylamido-1-hexane phosphonic acid, N-methyl-2-methacrylamido-1-hexane phosphonic acid, N-methyl-2-acrylamido-1-heptane phosphonic acid, N-methyl-2-methacrylamido-1-heptane phosphonic acid, salts thereof, derivatives thereof, and blends thereof. The salts of acrylamido hydrocarbyl phosphonic acid include salts of the acid with alkali metal elements, alkaline earth metal elements, or elements of the Lanthanide or Actinide series, and blends thereof. For example, the salts can be ammonium, sodium, potassium, calcium, barium, magnesium, and/or aluminum salts of the acrylamido hydrocarbyl phosphonic acid.

The reactive vinyl monomer containing an amide functionality according to one aspect may be selected from the group consisting of: N-vinyl amides, N-vinyl lactams, acrylamides, derivatives thereof, and blends thereof.

A representative list of N-vinyl amides includes: N-vinyl formamide, N-vinyl-N-methyl formamide, N-vinyl-N-ethyl formamide, N-vinyl-N-(n-propyl)formamide, N-vinyl-N-isopropyl formamide, N-vinyl acetamide, N-vinyl-N-methyl acetamide, N-vinyl-N-ethyl acetamide, N-vinyl-N-(n-propyl)acetamide, N-vinyl-N-isopropyl acetamide, N-vinyl propionamide, N-vinyl-N-methyl propionamide, N-vinyl-N-ethyl propionamide, N-vinyl-N-(n-propyl)propionamide, N-vinyl-N-isopropyl propionamide, N-vinyl butanamide, N-vinyl-N-methyl butanamide, N-vinyl-N-ethyl butanamide, N-vinyl-N-(n-propyl)butanamide, N-vinyl-N-isopropyl butanamide, derivatives thereof, and blends thereof.

A representative list of N-vinyl lactams includes: N-vinyl-2-pyrrolidone, N-vinyl-2-piperidone, N-vinyl-2-caprolactam, N-vinyl-3-methyl-2-pyrrolidone, N-vinyl-3-methyl-2-piperidone, N-vinyl-3-methyl-2-caprolactam, N-vinyl-4-methyl-2-pyrrolidone, N-vinyl-4-methyl-2-caprolactam, N-vinyl-5-methyl-2-pyrrolidone, N-vinyl-5-methyl-2-piperidone, vinyl-5,5-dimethyl-2-pyrrolidone, N-vinyl-3,3,5-trimethyl-2-pyrrolidone, N-vinyl-5-methyl-5-ethyl-2-pyrrolidone, N-vinyl-3,4,5-trimethyl-3-ethyl-2-pyrrolidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, derivatives thereof, and blends thereof. Particularly useful N-vinyl lactams include N-vinyl-2-pyrrolidone, N-vinyl-2-piperidone and N-vinyl-2-caprolactam.

A representative list of acrylamides includes: acrylamide, N-methylacrylamide, N-ethylacrylamide, N-(n-propyl)acrylamide, N-isopropylacrylamide, N,N-dimethylacrylamide, N,N-diethylacrylamide, N,N-di(n-propyl)acrylamide, N,N-diisopropylacrylamide, N-methyl-N-ethylacrylamide, N-methyl-N-(n-propyl)acrylamide, N-methyl-N-(isopropyl)acrylamide, N-ethyl-N-(n-propyl)acrylamide, N-ethyl-N-(isopropyl)acrylamide, methacrylamide, N-methylmethacrylamide, N-ethylmethacrylamide, N-(n-propyl)methacrylamide, N-isopropylmethacrylamide, N,N-dimethylmethacrylamide, N,N-diethylmethacrylamide, N,N-di(n-propyl)methacrylamide, N,N-diisopropylmethacrylamide, N-methyl-N-ethylmethacrylamide, N-methyl-N-(n-propyl)methacrylamide, N-methyl-N-(isopropyl)methacrylamide, N-ethyl-N-(n-propyl)methacrylamide, N-ethyl-N-(isopropyl)methacrylamide, N-acryloylaziridine, N-acryloylpyrrolidine, N-acryloylpiperidine, N-acryloylhexamethyleneimine, N-acryloylheptamethyleneimine, N-acryloyloctamethyleneimine, N-methacryloylpyrrolidine, N-methacryloylaziridine, N-methacryloylpiperidine, N-methacryloylhexamethyleneimine, N-methacryloylheptamethyleneimine, N-methacryloyloctamethyleneimine, derivatives thereof, and blends thereof. The acrylamides can be N-acryloylpyrrolidine, N-acryloylpiperidine, N-acryloylhexamethyleneimine, N-methacryloylpyrrolidine, N-methacryloylpiperidine, or N-methacryloylhexamethyleneimine. Of course, blends of these materials can be used.

In another embodiment of the invention, the polymers: (A) are polymerized from at least one reactive vinyl monomer containing an acid functionality or a salt thereof and at least one reactive vinyl monomer containing an amide functionality, and (B) contain at least one solvent adduct. The reactive vinyl monomer containing an acid functionality or a salt thereof may be present from about 0.1% to about 99.9% by weight of the polymer, more particularly from about 1% to 50%, and yet more particularly from about 5% to 30%. The reactive vinyl monomer containing amide functionality may be present from about 0.1% to about 99.9% by weight of the polymer, more particularly from about 50% to 99%, and yet more particularly from about 70% to 95%. The solvent adduct may be present from about 0.1% to about 50% by weight of the polymer, more particularly from about 0.2% to about 35% by weight of the polymer, and yet more particularly from about 0.5% to about 20% by weight of the polymer. In certain embodiments, the polymers may have a molecular weight from about 500 Da to about 15,000 Da.

The solvent adduct can be polymerized from a solvent molecule having at least one hydroxyl group and/or at least one thiol group, e.g., a glycol ether, an alcohol or a thiol, or blends thereof. For example, the solvent can be a glycol ether, such as 2-methoxyethanol, 2-ethoxyethanol, 2-propoxyethanol, 2-isopropoxyethanol, 2-butoxyethanol, 2-phenoxyethanol, 2-benzyloxyethanol, 2-(2-methoxyethoxy)ethanol, 2-(2-ethoxyethoxy)ethanol, 2-(2-butoxyethoxy)ethanol, dimethoxyethane, diethoxyethane, dibutoxyethane, derivatives thereof, and blends thereof. The Examples section illustrates polymers synthesized in a solvent comprising 2-butoxyethanol. The solvent adducts may be bonded to the polymer chain at intermediate positions and/or at the end of the polymer chain.

Methods of Synthesis

The polymers described herein may be readily synthesized by procedures known by those skilled in the art, and include free radical polymerization, emulsion polymerization, ionic chain polymerization, living polymerization, and precipitation polymerization. Free radical polymerization can be used, especially when using water-dispersible and/or water-soluble reaction solvent(s). This type of polymerization method is described in "Decomposition Rate of Organic Free Radical Polymerization" by K. W. Dixon (section II in Polymer Handbook, volume 1, 4th edition, Wiley-Interscience, 1999), which is incorporated herein by reference.

Compounds capable of initiating the free-radical polymerization include those materials known to function in the prescribed manner, and include the peroxo and azo classes of materials. Peroxo and azo compounds include, but are not limited to: acetyl peroxide; azo bis-(2-amidinopropane)dihydrochloride; azo bis-isobutyronitrile; 2,2'-azo bis-(2-methylbutyronitrile); benzoyl peroxide; di-tert-amyl peroxide; di-tert-butyl diperphthalate; butyl peroctoate; tert-butyl dicumyl peroxide; tert-butyl hydroperoxide; tert-butyl perbenzoate; tert-butyl permaleate; tert-butyl perisobutylrate; tert-butyl peracetate; tert-butyl perpivalate; para-chlorobenzoyl peroxide; cumene hydroperoxide; diacetyl peroxide; dibenzoyl peroxide; dicumyl peroxide; didecanoyl peroxide; dilauroyl peroxide; diisopropyl peroxodicarbamate; dioctanoyl peroxide; lauroyl peroxide; octanoyl peroxide; succinyl peroxide; and bis-(ortho-toluoyl) peroxide.

Also suitable to initiate the free-radical polymerization are initiator mixtures or redox initiator systems, including: ascorbic acid/iron (II) sulfate/sodium peroxodisulfate, tert-butyl hydroperoxide/sodium disulfite, and tert-butyl hydroperoxide/sodium hydroxymethanesulfinate.

The polymerization reactions can be carried out in the presence of solvent(s). Glycol ethers are one example, and include those mentioned earlier. The polymers may be synthesized in a solvent and maintained therein, or the synthesis solvent separated from the polymer by methods known in the art and replaced by a solvent beneficial for formulary development and/or end-use. The polymerization temperature may vary from about 5° C. to about 500° C. The polymerization reaction may be carried out at ambient pressure, sub-atmospheric pressure, or super-atmospheric pressure. The polymerization reaction may be carried out in bulk, suspension, or emulsion medium, and may be in a batch, continuous or semi-continuous manner.

Compositions and Uses

The compositions comprising the polymers according to the invention may be used in numerous applications that include performance chemicals and personal care. Examples of performance chemical compositions include, without limitation: adhesives, agricultural, biocides, coatings, electronics, household-industrial-institutional (HI&I), inks, membranes, metal fluids, oilfield, paper, paints, plastics, printing, plasters, and wood-care applications.

The compositions for oilfield applications may further comprise ingredients such as gas hydrate inhibitors, corrosion inhibitors, rheology modifiers, wax inhibitors, solvents, biocides, emulsifiers, demulsifiers, surfactants, shale-swell inhibitors, defoamers, lubricants, weighting agents, viscosifiers, dispersants, drilling mud base oils, cements, proppants, mineral acids, organic acids, friction reducers, hydrogen sulfide removal or control additives, asphaltene control additives, paraffin control additives, scale control additives, and blends thereof. Nonlimiting examples of product forms include solutions, suspensions, emulsions, gels, pastes, concentrates, solids, and powders.

The compositions comprising polymers according to the invention can be used for kinetic gas hydrate inhibition, and/or anti-agglomeration. Disclosed herein is a method for preventing the formation of gas hydrates, or for reducing the growth of gas hydrates, or for reducing the tendency of gas hydrates to agglomerate in fluid comprising water and at least one hydrate-forming guest molecule. The method comprises contacting the fluid with the composition comprising the polymer(s) according to the invention. The hydrate-forming guest molecules include, but are not necessarily limited to: methane, ethane, ethylene, acetylene, propane, propylene, methylacetylene, n-butane, isobutane, 1-butene, trans-2-butene, cis-2-butene, isobutene, butene mixtures, isopentane, pentenes, natural gas, carbon dioxide, hydrogen sulfide, nitrogen, oxygen, argon, krypton, xenon, and mixtures thereof. Other examples of hydrate forming guest molecules include various natural gas mixtures that may be present in many gas and/or oil formations, processing plants, natural gas liquids, and mixtures thereof.

Contacting of gas hydrate inhibitor compositions with the fluid comprising water and hydrate-forming guest molecules may be achieved by a number of ways or techniques, including, but not necessarily limited to: mixing, blending with mechanical mixing equipment or devices, stationary mixing setup or equipment, magnetic mixing or other suitable methods, other equipment and means known to one skilled in the art and combinations thereof. The contacting can be made in-line or offline or both. The various components of the composition may be mixed prior to or during contact, or both. If needed or desired, the composition or some of its components may be optionally removed or separated mechanically, chemically, or by other methods known to one skilled in the art, or by a combination of these methods after the hydrate formation conditions are no longer present. Lower temperatures tend to be more favorable for hydrate formation.

It will be appreciated that it may be difficult to predict in advance the proportions of gas hydrate inhibitor effective in inhibiting hydrate formations in every situation or location. There are a number of complex, interrelated factors that must be taken into account in determining the effective dosage or proportion, including, but not necessarily limited to, the proportion of water in the contacting fluid, the nature of the fluid, the nature of the hydrate-forming guest molecules, the temperature and pressure conditions, the particular gas hydrate inhibitor employed, etc. Experimentation with a particular set of conditions or in a specific system may be a suitable way to determine the optimum dosage range. Care should be taken to avoid the formation of problematic quantities of irreversible, harmful hydrate masses. Nevertheless, in the interest of attempting to provide some general guidance of effective proportions, the polymers according to the invention typically is present in an amount from about 0.005% to about 20% by weight, more particularly from about 0.01% to about 5% by weight of the water or aqueous phase present in the fluid comprising water and hydrate-forming guest molecules.

In another embodiment, compositions comprising the described polymers are used for preventing and/or reducing corrosion of metal-containing materials. The materials comprising iron include grades of cast iron, wrought iron, and steel (alloys comprising iron and carbon). The composition for corrosion inhibition may be added to a mobile or a static fluid that is further in contact with the metal-containing material. This addition could be accomplished by a number of ways or techniques, including, but not necessarily limited to mixing, blending with mechanical mixing equipment or devices, stationary mixing setup or equipment, magnetic mixing or other equipment and means known to one skilled in the art and combinations thereof to provide adequate contact and/or dispersion of the composition in the fluid. The contacting may be made in-line or offline or both. The various components of the composition may be mixed prior to, or during contact, or both.

The effective amount of the composition for inhibition and/or prevention of corrosion will vary depending upon the particular system for which treatment is desired and will be influenced by factors such as the area subject to corrosion, pH, temperature, water quantity and respective concentrations of corrosive species in water. Typically, the polymers may be present in an amount from about 0.01 parts per million (ppm) to about 50,000 ppm, more particularly from about 0.05 ppm to about 10,000 ppm, and yet more particularly from about 0.5 ppm to about 5,000 ppm of the fluid that is in contact with the metal-containing material.

Characterization of Polymers

The polymers and compositions comprising the polymers according to the invention can be analyzed by known techniques. The techniques of $^{13}$C nuclear magnetic resonance (NMR) spectroscopy, gas chromatography (GC), and gel permeation chromatography (GPC) may be used to decipher polymer identity, residual monomer concentrations, polymer molecular weight, and polymer molecular weight distribution.

Nuclear magnetic resonance (NMR) spectroscopy is a particularly useful method to probe the polymerization product in terms of chemical properties such as monomeric composition, sequencing and tacticity. Analytical equipment suitable for these analyses includes the Inova 400-MR NMR System by Varian Inc. (Palo Alto, Calif.). References broadly describing NMR include: Yoder, C. H. and Schaeffer Jr., C. D., *Introduction to Multinuclear NMR*, The Benjamin/Cummings Publishing Company, Inc., 1987; and Silverstein, R. M., et al., *Spectrometric Identification of Organic Compounds*, John Wiley & Sons, 1981, which are incorporated in their entirety by reference.

Residual monomer levels can be measured by GC, which can be used to indicate the extent of reactant conversion by the polymerization process. GC analytical equipment to perform these tests are commercially available, and include the following units: Series 5880, 5890, and 6890 GC-FID and GC-TCD by Agilent Technologies, Inc. (Santa Clara, Calif.). GC principles are described in *Modern Practice of Gas Chromatography*, third edition (John Wiley & Sons, 1995) by Robert L. Grob and Eugene F. Barry, which is hereby incorporated in its entirety by reference.

GPC is an analytical method that separates molecules based on their hydrodynamic volume (or size) in solution of the mobile phase, such as hydroalcoholic solutions with surfactants. GPC is a preferred method for measuring polymer molecular weight distributions. This technique can be performed on known analytical equipment sold for this purpose, such as the TDAmax™ Elevated Temperature GPC System and the RImax™ Conventional Calibration System by Viscotek™ Corp. (Houston, Tex.). In addition, GPC employs analytical standards as a reference, of which a plurality of narrow-distribution polyethylene glycol and polyethylene oxide standards representing a wide range in molecular weight are typically used. These analytical standards are available for purchase from Rohm & Haas Company (Philadelphia, Pa.) and Varian Inc. (Palo Alto, Calif.). GPC is described in the following texts, which are hereby incorporated in their entirety by reference: Schroder, E., et al., *Polymer Characterization*, Hanser Publishers, 1989; Billingham, N. C., *Molar Mass Measurements in Polymer Science*, Halsted Press, 1979; and Billmeyer, F., *Textbook of Polymer Science*, Wiley Interscience, 1984.

The invention will now be described with reference to the following non-limiting examples:

EXAMPLES

Example 1

Synthesis of Poly(VCL-Co-Sodium Vinyl Phosphonate) in BGE/Water

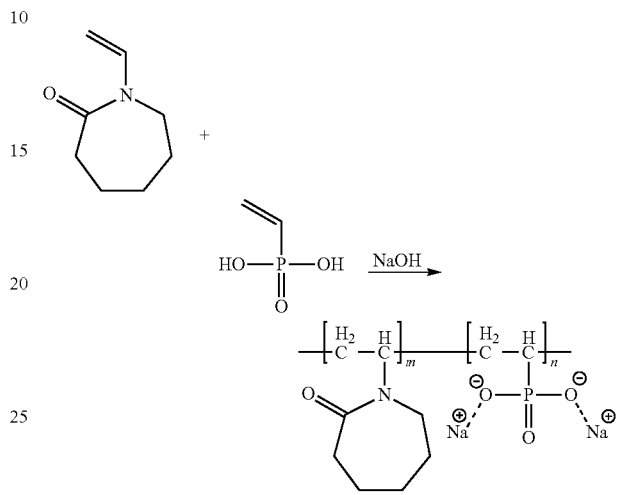

Vinyl phosphonic acid (VPA) aqueous solution (10 g, 45%) was neutralized with 20% NaOH solution to pH greater than 9 to obtain sodium vinyl phosphonate, then mixed with 85.5 g of N-vinyl-2-caprolactam (VCL) and 90 g of 2-butoxyethanol (BGE). The mixture was used as the feeding solution. Approximately 60 g of this solution was charged into a 500 mL glass kettle fitted with a propeller agitator, reflux condenser, nitrogen inlet tube and thermowatch. With nitrogen purge and vigorous stirring, the reactor was heated to 125° C. After holding for 0.5 hour, the feeding solution was metered into the reactor over the period of 2 hours and 2.0 g of di-tert-butyl peroxide was added hourly, twice. After completion of feeding, 0.2 g of di-tert-butyl peroxide was charged. The reaction was held at 150° C. for 3 hours and three booster shots of 0.2 g of di-tert-butyl peroxide were added hourly. After the last shot of booster, the reaction was kept for additional 1.0 hour then cooled down to room temperature to discharge the product.

The product obtained was a yellow, viscous polymer poly(N-vinyl-2-caprolactam-co-sodium vinyl phosphonate) in BGE/water at 33% solids with a molecular weight of about 11,000 Da.

Example 2

Synthesis of Poly(VCL-Co-VPA) in BGE/Water

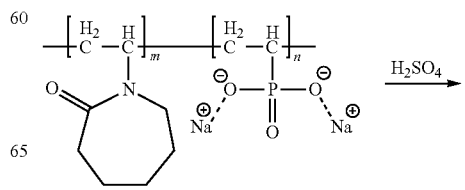

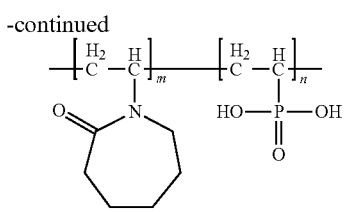

The polymer solution obtained from Example 1 was acidified with sulfuric acid. Then, 2.05 g of 98% sulfuric acid was added dropwise into 65 g of the copolymer solution with magnetic stilling. The pH of final solution was less than 5.

The resultant polymer was characterized as poly(VCL-co-vinyl phosphonic acid).

Example 3

Synthesis of Poly(VCL-Co-NaAMPS) in BGE/Water

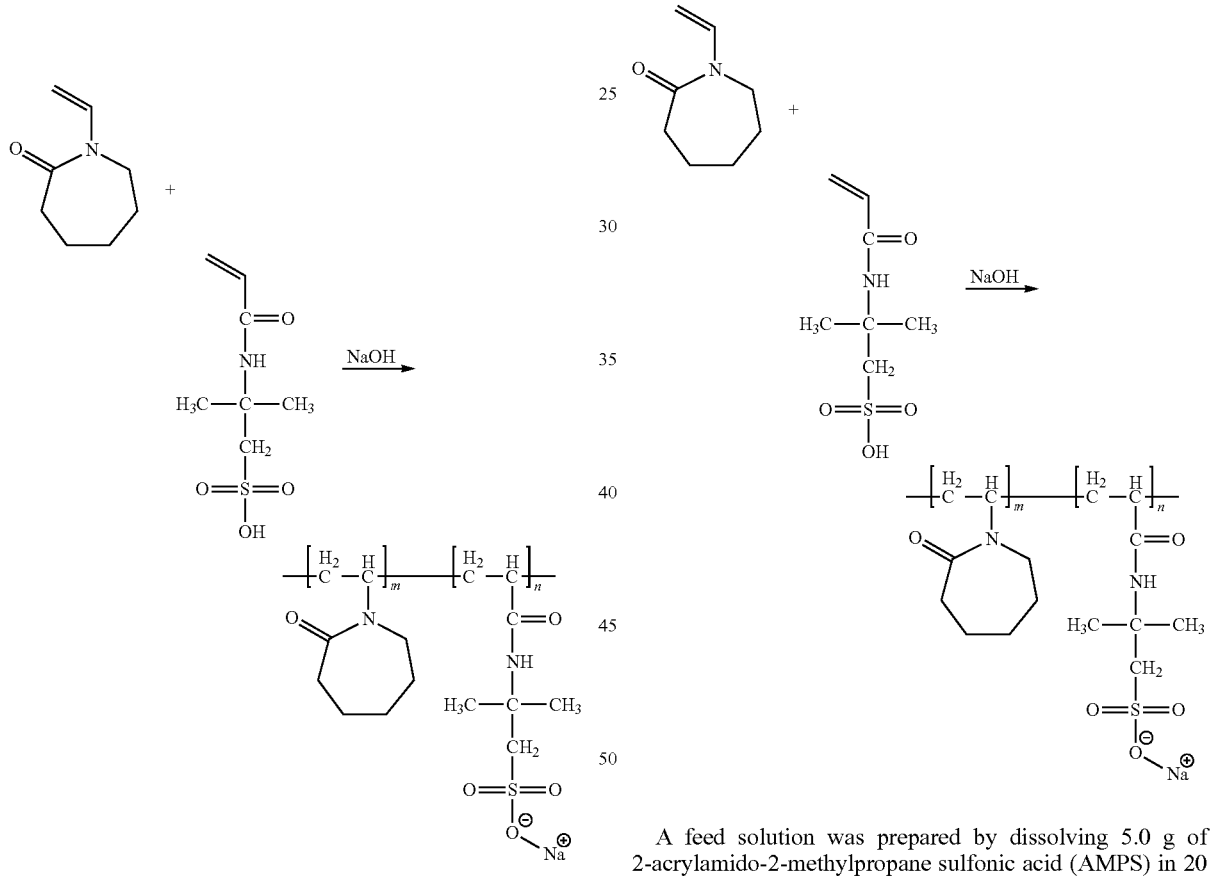

A feed solution was prepared by dissolving 10.0 g of 2-acrylamido-2-methylpropane sulfonic acid (AMPS) in 300 g of deionized water, neutralizing the solution with 20 g of 10% NaOH solution (pH>8), and then adding 90.0 g of N-vinyl-2-caprolactam (VCL) and 100 g of 2-butoxyethanol (BGE). To begin the reaction scheme, approximately 50 g of 2-butoxyethanol was charged into a 500 mL glass kettle fitted with a propeller agitator, reflux condenser, nitrogen inlet tube and thermowatch. With nitrogen purge and vigorous stirring, the reactor was heated to 116° C., at which point the feed solution was metered into the reactor over the period of 3 hours. During this time a total of 14 shots of 0.375 g of the initiator test-amyl peroxy-2-ethylhexanoate (Trigonox® 121, Akzo Nobel) was added into the reactor every 15 minutes. The reaction temperature varied from 108° C. to 114° C. After complete addition of the feed solution, the reactor was cooled to 105° C. Then, two more shots of Trigonox® 121 were charged into the reactor 30 minutes apart from one another. The reaction was maintained at 105° C. for 1 hour after the last shot of Trigonox® 121, and then cooled to room temperature.

The product discharged from the reactor was a yellow, slightly hazy copolymer P(VCL/NaAMPS) in BGE/water at 33.3% solids. The resulted product is a viscous, yellow and hazy solution.

Example 4

Synthesis of Poly(VCL-Co-NaAMPS) in BGE/Water

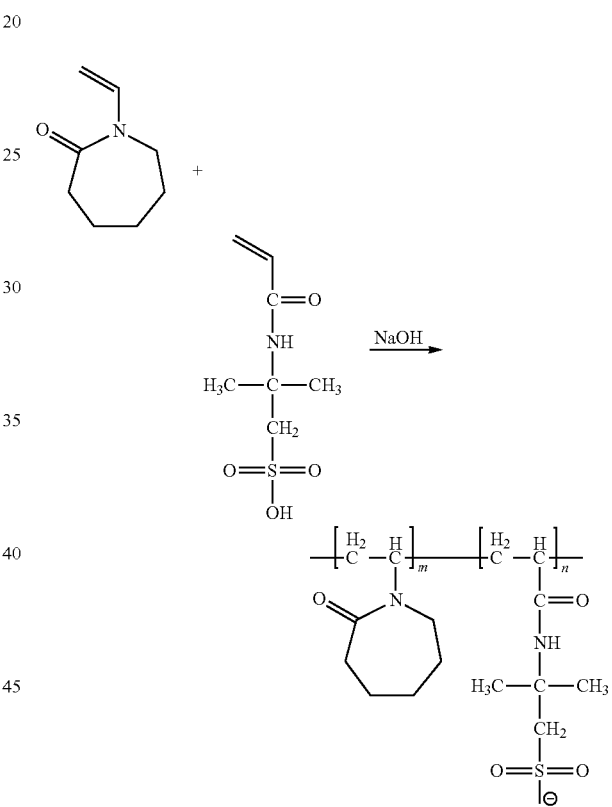

A feed solution was prepared by dissolving 5.0 g of 2-acrylamido-2-methylpropane sulfonic acid (AMPS) in 20 g deionized water, neutralizing the solution with 10 g of 10% NaOH solution (pH>8), and then adding 95.0 g of N-vinyl-2-caprolactam and 73 g of 2-butoxyethanol. To begin the reaction scheme approximately 50 g of 2-butoxyethanol were charged into a 500 mL glass kettle fitted with a propeller agitator, reflux condenser, nitrogen inlet tube and thermowatch. With nitrogen purge and vigorous stirring, the reactor was heated to 116° C., and then the feeding solution was metered into the reactor over the period of 3 hours. During this time a total of 14 shots of 0.375 g of the initiator tert-amyl peroxy-2-ethylhexanoate (Trigonox® 121, Akzo Nobel) was added into the reactor every 15 minutes. The reaction temperature varied from 108° C. to 114° C. After completion of feeding, the reactor was cooled to 105° C. Then, two more shots of Trigonox® 121 were charged into the reactor 30 minutes apart from one another. The reaction was maintained at 105° C. for 1 hour after the last shot of Trigonox® 121, and then cooled to room temperature.

The product obtained was a yellow, slightly hazy copolymer P(VCL/NaAMPS) in a blend of 2-butoxyethanol and water at 40% solids. Gel permeation chromatography (GPC) revealed the polymer had a weight-average molecular weight of 2,600 Da, a number-average molecular weight of 1,060 Da, and a polydispersity index of 2.5. Polyethylene glycol was employed as the GPC standard.

Method 1: Test Method to Evaluate Gas Hydrate Inhibition

Gas hydrate inhibition tests were conducted in a 500 mL, 316 stainless steel autoclave vessels having a usable volume of 200 mL, equipped with a thermostated cooling jacket, sapphire window, inlet and outlet, platinum resistance thermometer (PRT) and magnetic stirring pellet. The rig is rated up to 400° C. and down to −25° C. Temperature and pressure was data-logged, while the cell content was visually monitored by a boroscope video camera connected to a time lapse video recorder. Hydrate formation in the rig was detected using a combination of three methods: visual detection of hydrate crystals, decrease in vessel pressure due to gas uptake and by the temperature exotherm created by heat released during hydrate formation. A commercial software package, PVTSim® (Calsep A/S, Lyngby, Denmark) was used to predict the gas hydrate equilibrium melting temperature for the operational pressure and synthetic gas. The equilibrium temperature for hydrate decomposition for the synthetic gas in distilled water and a pressure of 60 bar is about 17.5° C., the hydrate subcooling is equal to 10.5° C. Hydrocarbon gas mixture of composition according to Table 1 was used for gas hydrate inhibition testing.

TABLE 1

Composition of the hydrocarbon gas used in Method 1

| Component | Mole (%) |
| --- | --- |
| Nitrogen | 0.39 |
| Methane | 87.26 |
| Ethane | 7.57 |
| Propane | 3.10 |
| iso-butane | 0.49 |
| n-butane | 0.79 |
| iso-pentane | 0.20 |
| n-pentane | 0.20 |
| Total | 100.0 |

Examples 5-12

Evaluations of Gas Hydrate Inhibition

The induction time was measured using Method 1 for two blank solutions (i.e., containing no gas hydrate inhibitor) and for compositions comprising the two polymers described in Examples 1 through 4.

These polymers exhibited excellent gas hydrate inhibition, as the induction times were in excess of 48 hours (Table 2).

TABLE 2

Measured gas hydrate induction times for compositions and conditions according to Examples 5-12.

| Example | Composition (0.6% active) | Test conditions P (bar) | T (° C.) | ΔT* (° C.) | Induction time (h) |
| --- | --- | --- | --- | --- | --- |
| 5 | Blank | 60 | 7 | 9.5 | 0 |
| 6 | Blank | 35 | 4 | 10.5 | 0 |
| 7 | Polymer of Example 1 | 60 | 7 | 10.5 | >48 |
| 8 | Polymer of Example 2 | 60 | 7 | 10.5 | >48 |
| 9 | Polymer of Example 1 | 35 | 4 | 9.5 | >48 |
| 10 | Polymer of Example 2 | 35 | 4 | 9.5 | >48 |
| 11 | Polymer of Example 3 | 60 | 7 | 10.5 | >48 |
| 12 | Polymer of Example 4 | 60 | 7 | 10.5 | >48 |

*subcooling temperature

Method 2: Test Method to Evaluate Corrosion Inhibition

Corrosion inhibition tests were conducted under dynamic conditions of high shear stress using the following method: The corrosion test apparatus consisted of a 100 mL jacket test vessel fitted with gas inlet and outlet ports, and a rotating electrode connected to an electrochemical test system. The test vessel was filled with 100 g of a test solution consisting of 3% NaCl in double distilled water, or 3% NaCl solution with 50 parts-per-million (ppm) corrosion inhibitor. Then, the test solution was purged with nitrogen at least for 30 minutes to remove oxygen. At the same time, the temperature of the test solution was heated to 30° C. A cylindrical, 1018-carbon steel coupon was degreased by submersing it into hexane for 5 minutes, followed by acetone submersion for 5 minutes. The coupon was removed, dried, and then polished using 1,200-grade silicon carbide paper, and then rinsed in double distilled water. Then, it was dried in an oven at 35° C. This pretreated metal coupon was mounted on the shaft of the rotating cylinder electrode and inserted into the test solution. The electrode rotated at 1000 rpm for a total time of approximately 2 hours. A linear polarization resistance technique was used to determine the corrosion rate (CR), and data were collected at 30-minute intervals for up to 2 hours. The corrosion inhibitory efficiency (IE) was determined using the following equation:

$$IE = \frac{CR_{no\ inhibitor} - CR_{w.inhibitor}}{CR_{no\ inhibitor}} \times 100$$

wherein $CR_{no\ inhibitor}$ is the corrosion rate in absence of an inhibitor and $CR_{w.inhibitor}$ is the corrosion rate in the presence of the inhibitor.

Example 13

The corrosion inhibitory efficiency (GE) was measured using Method 2 for the polymer of Example 1.

A significant increase in corrosion inhibitory effect was recorded for the polymer of Example 1 in brine (3% NaCl solution) (Table 3).

TABLE 3

Results of corrosion testing according to Example 13.

| Composition (50 ppm inhibitor) | VCL:VPA ratio (w/w) | Inhibitory Effect (IE) | | |
| --- | --- | --- | --- | --- |
| | | run 1 | run 2 | Average |
| 3% NaCl solution (no inhibitor) | — | 0% | 0% | 0% |
| Polymer of Example 1 | 95:5 | 66% | 69% | 68% |

The invention has been described in detail with particular reference to particular embodiments thereof, but it will be understood that variations and modifications can be effected within the spirit and scope of the invention.

What is claimed is:

1. A polymer polymerized from at least one reactive vinyl monomer having acid functionality or a salt thereof wherein said reactive vinyl monomer and functionality is selected from the group consisting of: vinyl sulfonic acids, acrylamido hydrocarbyl sulfonic acids, vinyl phosphonic adds, acrylamido hydrocarbyl phosphonic acids, salts thereof, and blends thereof, and at least one reactive vinyl monomer having amide functionality wherein said vinyl monomer having amide functionality is vinyl caprolactam, wherein the polymer has a molecular weight from about 500 Da to about 15,000 Da., said polymer comprising at least one solvent adduct covalently bonded to the polymer in intermediate positions present in an amount from about 0.1% to about 20% by weight of the polymer, wherein said solvent adduct is obtained from a glycol ether, 2 butoxyethanol, or blends thereof, and said polymer is synthesized in said solvent.

2. The polymer according to claim 1 that is a random, block, graft, or alternating polymer.

3. The polymer according to claim 1 wherein said reactive vinyl monomer containing acid functionality or salt thereof is present from about 0.1% to about 99.9% by weight.

4. The polymer according to claim 1 wherein said vinyl sulfonic acid is selected from the group consisting of: ethenesulfonic acid, 1-propene-1-sulfonic acid, 2-propene-1-sulfonic acid, 2-butene-1-sulfonic acid, 1-butene-1-sulfonic acid, 3-butene-1-sulfonic acid, 3-allyloxy-2-hydroxy-1-propane-sulfonic acid, 3-sulfopropyl acrylate, 2-sulfoethyl acrylate, salts thereof, and blends thereof.

5. The polymer according to claim 1 wherein said acrylamido hydrocarbyl sulfonic acid is selected from the group consisting of: 2-acrylamido-2-methyl propane sulfonic acid, 2-acrylamido-2-ethyl propane sulfonic acid, 2-acrylamido-2-propyl propane sulfonic acid, 2-methacrylamido-2-methyl propane sulfonic acid, 2-methacrylamido-2-ethyl propane sulfonic acid, 2-methacrylamido-2-propyl propane sulfonic acid, N-methyl-2-acrylamido-2-methyl propane sulfonic acid, N-methyl-2-acrylamido-2-ethyl propane sulfonic acid, N-methyl-2-acrylamido-2-propyl propane sulfonic acid, N-methyl-2-methacrylamido-2-methyl propane sulfonic acid, N-methyl-2-methacrylamido-2-ethyl propane sulfonic acid, N-methyl-2-methacrylamido-2-propyl propane sulfonic acid, 2-acrylamido-1-butane sulfonic acid, 2-acrylamido-1-pentane sulfonic acid, 2-acrylamido-1-hexane sulfonic acid, 2-methacrylamido-1-butane sulfonic acid, 2-methacrylamido-1-pentane sulfonic acid, 2-methacrylamido-1-hexane sulfonic acid, 2-acrylamido-1-heptane sulfonic acid, 2-methacrylamido-1-heptane sulfonic acid, N-methyl-2-acrylamido-1-butane sulfonic acid, N-methyl-2-methacrylamido-1-butane sulfonic acid, N-methyl-2-acrylamido-1-pentane sulfonic acid, N-methyl-2-methacrylamido-1-pentane sulfonic acid, N-methyl-2-acrylamido-1-hexane sulfonic acid, N-methyl-2-methacrylamido-1-hexane sulfonic acid, N-methyl-2-acrylamido-1-heptane sulfonic acid, N-methyl-2-methacrylamido-1-heptane sulfonic acid, salts thereof, and blends thereof.

6. The polymer according to claim 1 wherein said acrylamido hydrocarbyl phosphonic acid is selected from the group consisting of: 2-acrylamido-2-methyl propane phosphonic acid, 2-acrylamido-2-ethyl propane phosphonic acid, 2-acrylamido-2-propyl propane phosphonic acid, 2-methacrylamido-2-methyl propane phosphonic acid, 2-methacrylamido-2-ethyl propane phosphonic acid, 2-methacrylamido-2-propyl propane phosphonic acid, N-methyl-2-acrylamido-2-methyl propane phosphonic acid, N-methyl-2-acrylamido-2-ethyl propane phosphonic acid, N-methyl-2-acrylamido-2-propyl propane phosphonic acid, N-methyl-2-methacrylamido-2-methyl propane phosphonic acid, N-methyl-2-methacrylamido-2-ethyl propane phosphonic acid, N-methyl-2-methacrylamido-2-propyl propane phosphonic acid, 2-acrylamido-1-butane phosphonic acid, 2-acrylamido-1-pentane phosphonic acid, 2-acrylamido-1-hexane phosphonic acid, 2-methacrylamido-1-butane phosphonic acid, 2-methacrylamido-1-pentane phosphonic acid, 2-methacrylamido-1-hexane phosphonic acid, 2-acrylamido-1-heptane phosphonic acid, 2-methacrylamido-1-heptane phosphonic acid, N-methyl-2-acrylamido-1-butane phosphonic acid, N-methyl-2-methacrylamido-1-butane phosphonic acid, N-methyl-2-acrylamido-1-pentane phosphonic acid, N-methyl-2-methacrylamido-1-pentane phosphonic acid, N-methyl-2-acrylamido-1-hexane phosphonic acid, N-methyl-2-methacrylamido-1-hexane phosphonic acid, N-methyl-2-acrylamido-1-heptane phosphonic acid, N-methyl-2-methacrylamido-1-heptane phosphonic acid, salts thereof, and blends thereof.

7. The polymer according to claim 1 wherein said reactive vinyl monomer containing amide functionality is present from about 0.1% to about 99.9% by weight.

8. A composition comprising the polymer according to claim 1.

9. The composition according to claim 8 further comprising at least one additive selected from the group consisting of: gas hydrate inhibitors, corrosion inhibitors, rheology modifiers, wax inhibitors, solvents, biocides, emulsifiers, demulsifiers, surfactants, shale-swell inhibitors, defoamers, scale inhibitors, cementing fluids, fluid loss additives, drilling fluids, viscosifiers, and blends thereof.

10. The composition according to claim 8 wherein said polymer is selected from the group consisting of: poly(N-vinyl-2-caprolactam-co-vinyl phosphoric acid), poly(N-vinyl-2-caprolactam-ter-N-vinyl-2-pyrrolidone-ter-vinyl phosphonic acid), poly(N-vinyl-2-caprolactam-co-2-acrylamido-2-methyl propane sulfonic add), poly(N-vinyl-2-caprolactam-ter-N-vinyl-2-pyrrolidone-ter-2-acrylamido-2-methyl propane sulfonic add), salts thereof, and blends thereof.

11. A method for preventing the formation of gas hydrates, or for reducing the growth of gas hydrates, or for reducing the tendency of gas hydrates to agglomerate in a fluid comprising water and at least one hydrate-forming guest molecule, said method comprising contacting said fluid with a composition comprising the polymer according to claim 1.

12. The method according to claim 11 wherein said polymer is present in an amount from about 0.01% to about 5% based on weight of said water present in said fluid.

13. A method for preventing or reducing corrosion of materials comprising iron in contact with a fluid, said method comprising contacting said fluid with a composition comprising the polymer according to claim 1.

14. The method according to claim 13 wherein said polymer is present in an amount from about 0.1 ppm to about 5000 ppm based on said fluid.

15. The polymer according to claim 1, wherein the polymer has the structure set out below:

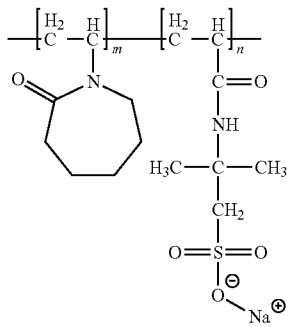

wherein m and n independently range from about 500 Da to about 15,000 Da.

16. The polymer according to claim 1, wherein the polymer has the structure set out below:

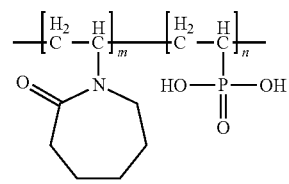

wherein m and n independently range from about 500 Da to about 15,000 Da.

17. The polymer according to claim 1, wherein the polymer has the structure set out below:

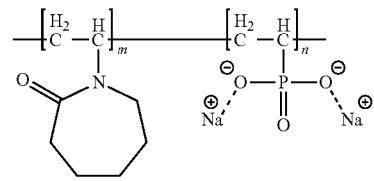

wherein m and n independently range from about 500 Da to about 15,000 Da.

* * * * *